UNITED STATES PATENT OFFICE.

LUCIEN JUMAU, OF PARIS, FRANCE.

PROCESS FOR OBTAINING PURE COPPER FROM A SOLUTION OF COPPER.

No. 883,962. Specification of Letters Patent. Patented April 7, 1908.

Application filed January 19, 1907. Serial No. 353,063.

*To all whom it may concern:*

Be it known that I, LUCIEN JUMAU, citizen of France, residing at Paris, in the said Republic, have invented new and useful Improvements in Metallurgical Processes for Obtaining Pure Copper from a Solution of Copper Prepared by any Known Method, (for which a French patent of addition, N. 6478 of July 11, 1906, has been obtained,) of which the following is a specification.

My invention relates to an improved process for obtaining pure metallic copper from a solution of salts of copper, and it consists in the steps and processes herein described and claimed.

In the operation of my invention, an ammoniacal solution containing salts of copper is obtained as by leaching the ores with an ammoniacal solution. Such solution containing the copper salts is then treated with a suitable sulfite, such as, for example, sulfite of hydrogen, commercially known as sulfurous acid. In this step, the precipitate contains cuprous sulfite, usually in the form of cuproso-cupric sulfite. The said precipitate is then heated under pressure in the presence of an aqueous substance. The solution from which the precipitate has been thrown down can be satisfactorily employed to constitute the required aqueous substance, or the precipitate can be separated from said solution and water supplied to provide the aqueous substance.

The final operation of the last described step, omitting certain intermediate reactions, may be stated as follows:

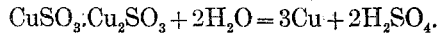

$$CuSO_3 \cdot Cu_2SO_3 + 2H_2O = 3Cu + 2H_2SO_4.$$

The copper precipitate thus obtained is absolutely pure and free from sulfite or oxid of copper.

The above described reaction is found to begin between the temperatures of 140° C. and 160° C., and to become nearly completed at 170° C. The process can, therefore, be conveniently carried out in any usual lead lined digester of copper or iron.

The copper may be further refined, if desired, by any usual method, such as the electrolytic process.

I have illustrated a preferred and satisfactory process, but, obviously, changes could be made within the spirit and scope of my invention.

Having thus described my invention, what I claim as new therein and desire to secure by Letters Patent is:—

1. The herein described process for obtaining pure copper from an ammoniacal solution containing salts of copper, which consists in treating said solution with a sulfite for precipitating copper compounds, and heating said precipitate under pressure in the presence of an aqueous substance.

2. The herein described process for obtaining pure copper from an ammonical solution containing salts of copper, which consists in treating said solution with sulfite of hydrogen for precipitating copper compounds, and heating said precipitate under pressure in the presence of water.

3. The herein described process for obtaining pure copper from an ammoniacal solution containing salts of copper, which consists in treating said solution with a sulfite for precipitating copper compounds, and heating said precipitate below 180° C. under pressure in the presence of an aqueous substance.

4. The herein described process for obtaining pure copper from an ammoniacal solution containing salts of copper, which consists in treating said solution with a sulfite for precipitating copper compounds, and heating said precipitate to a temperature between 140° C. and 170° C. under pressure in the presence of an aqueous substance.

In testimony whereof I have signed my name to this specification in the presence of two subscribing witnesses.

LUCIEN JUMAU.

Witnesses:
 JULE FAYOLLET,
 EUGÈNE PICHON.